(12) United States Patent
Thorén et al.

(10) Patent No.: US 9,108,674 B2
(45) Date of Patent: Aug. 18, 2015

(54) STEERING DEVICE FOR ARTICULATED VEHICLE

(75) Inventors: Max Thorén, Örnsköldsvik (SE); Martin Carlsson, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 14/006,953

(22) PCT Filed: Mar. 19, 2012

(86) PCT No.: PCT/SE2012/050301
§ 371 (c)(1),
(2), (4) Date: Nov. 26, 2013

(87) PCT Pub. No.: WO2012/128706
PCT Pub. Date: Sep. 27, 2012

(65) Prior Publication Data
US 2014/0190756 A1    Jul. 10, 2014

(30) Foreign Application Priority Data
Mar. 23, 2011 (SE) ...................................... 1150257

(51) Int. Cl.
*B62D 12/00* (2006.01)
*B62D 55/065* (2006.01)

(52) U.S. Cl.
CPC ............ *B62D 12/00* (2013.01); *B62D 55/0655* (2013.01)

(58) Field of Classification Search
CPC ....... B62D 12/00; B62D 53/02; B65D 55/065
USPC ........ 180/14.1, 235, 418; 237/12.3 R, 12.3 B
See application file for complete search history.

(56) References Cited

U.S. PATENT DOCUMENTS 2,116,538 A * 5/1938 Mussey et al. .................. 165/43
2,933,143 A * 4/1960 Robinson et al. ............ 180/14.1
(Continued)

FOREIGN PATENT DOCUMENTS

RU         2206859 C1    6/2003
WO         00/35735 A1   6/2000
(Continued)

OTHER PUBLICATIONS

International Search Report and Written Opinion received for PCT Patent Application No. PCT/SE2012/050301, mailed on May 11, 2012, 12 pages.
(Continued)

*Primary Examiner* — Joseph Rocca
*Assistant Examiner* — Gabriela C Craciun
(74) *Attorney, Agent, or Firm* — Morrison & Foerster LLP (57) ABSTRACT

The present invention relates to a steering device (I) comprising a steering member (10) for mutually steering a first vehicle unit (2) and a second vehicle unit (3) of an articulated vehicle (1) comprising means (30, 32) for mutually pivoting said vehicle units, wherein the steering device comprises a housing configuration (50) arranged to form a supply space between said vehicle units (2, 3), comprising means (5, 6, 8, S; 60, 62, A, O) arranged for removal of stuff in the supply space (S) incoming from the surrounding. The invention also relates to an articulated vehicle with a steering member.

7 Claims, 5 Drawing Sheets

(56) References Cited

U.S. PATENT DOCUMENTS

| | | | | |
|---|---|---|---|---|
| 3,035,654 | A | * | 5/1962 | Nuttall, Jr. et al. .......... 180/14.4 |
| 3,491,847 | A | * | 1/1970 | Abbott .......................... 180/271 |
| 3,604,526 | A | * | 9/1971 | Hutchison ..................... 180/235 |
| 5,253,727 | A | * | 10/1993 | Etherington et al. ......... 180/420 |
| 5,632,350 | A | * | 5/1997 | Gauvin ........................ 180/9.44 |
| 5,873,431 | A | * | 2/1999 | Butler et al. .................. 180/418 |
| 6,021,843 | A | * | 2/2000 | Roach ............................. 165/41 |
| 6,581,718 | B1 | * | 6/2003 | Vigren et al. ................. 180/420 |
| 8,573,505 | B1 | * | 11/2013 | Hennessy ................. 237/12.3 R |
| 2002/0056579 | A1 | * | 5/2002 | Cooper ........................ 180/14.2 |
| 2003/0221880 | A1 | * | 12/2003 | Stummer ..................... 180/14.1 |
| 2005/0039973 | A1 | * | 2/2005 | Clark ........................... 180/418 |
| 2012/0193881 | A1 | * | 8/2012 | Svardby et al. .............. 280/28.5 |

FOREIGN PATENT DOCUMENTS

| | | |
|---|---|---|
| WO | 2011/005180 A1 | 1/2011 |
| WO | 2011/037521 A1 | 3/2011 |
| WO | 2011/037531 A1 | 3/2011 |

OTHER PUBLICATIONS

Office Action received for Swedish Patent Application No. 1150257-2, mailed on Oct. 7, 2011, 3 pages.

Extended European Search Report and Search Opinion received for EP Patent Application No. 12760663.0, mailed on Oct. 17, 2014, 5 pages.

\* cited by examiner

STEERING DEVICE FOR ARTICULATED VEHICLE

CROSS REFERENCE TO RELATED APPLICATIONS

This application is a U.S. National Phase patent application of PCT/SE2012/050301, filed Mar. 19, 2012, which claims priority to Swedish Patent Application No. 1150257-2, filed Mar. 23, 2011, each of which is hereby incorporated by reference in the present disclosure in its entirety.

TECHNICAL FIELD

The invention relates to a steering device for an articulated vehicle. The invention also relates to an articulated vehicle.

BACKGROUND ART

Steering members for articulated vehicle, particularly articulated tracked vehicle, comprising a front vehicle unit and a rear vehicle unit steerably interconnected by means of the steering member are known. The front and rear vehicle units are interconnected over a link mechanism of the steering member comprising link shafts about which both vehicle units are mutually pivotable by means of hydraulic cylinders.

WO 00/35735 discloses a steering member for an articulated vehicle being configured in such a way that the vehicle units firstly may rotate mutually about a longitudinal, horizontal shaft, secondly pivot mutually about two parallel, transversal horizontal shafts, and thirdly obtain an improved steering geometry with the vertical steering link situated centrally between the vehicle units.

Articulated vehicles with such steering member comprises a driveline for operation of front and rear vehicle units, wherein the driveline is arranged to run from the front to the rear vehicle units in connection to the steering member/through the steering member for drive of the rear vehicle unit. Further, according to a variant of such steering members, electricity, fuel, brake fluid and fluid for air-conditioning device are arranged to be transferred in conduits between the vehicle units in connection to/through the steering device.

Due to the fact that the steering member is exposed between the vehicle units it constitutes a weak point of the articulated vehicle. A problem with such a steering member is consequently that it is subjected to external impact, e.g. effective fire in a war situation, such that e.g. the steering of the vehicle or other sensitive function such as braking, drive function, electricity is put out of operation.

RU2206859 discloses a steering member for mutually steering a first and a second vehicle unit of an articulated vehicle. The steering member comprises a self-supporting house configuration in the shape of a tunnel arranged to form a supply space for protecting crew during transport of ammunition between the vehicle units. Such a housing configuration needs to be relatively large and consequently requires a lot of material which results in the steering member becoming relatively heavy wherein propulsion of the vehicle correspondingly requires relatively much energy. Further the accessibility is impaired among others in soft terrain due to weight and size.

OBJECTS OF THE INVENTION

An object of the present invention is to provide a steering device for an articulated vehicle which improves the reliability during drive.

SUMMARY OF THE INVENTION

These and other objects, apparent from the following description, may be achieved by a steering device for an articulated vehicle and an articulated vehicle, which are described below.

According to the invention the objects are achieved by a steering device comprising a steering member for mutually steering a first vehicle unit and a second vehicle unit of an articulated vehicle comprising means for mutually pivot said vehicle units, wherein the steering device comprises a housing configuration arranged to form a supply space between said vehicle units, comprising means arranged for removal of stuff in the supply space incoming from the surrounding. Hereby the risk of stuff in the housing configuration affecting the steering is avoided/reduced, wherein the reliability thus is improved.

According to an embodiment of the steering device said means comprises a heating device arranged to heat air intended to stream through the housing configuration. Hereby removal of snow and/or ice introduced from the surrounding if facilitated through heating of said snow/ice by means of the air streaming through the housing configuration and/or prevention of ice formation in that the space is kept warm by means of the air streaming through the housing configuration. Thereby the risk of snow and/or ice in the housing configuration affecting the steering is avoided/reduced, wherein the reliability thus is improved.

According to an embodiment of the steering device said means comprises an air intake arranged in a vehicle unit, a radiator arranged downstream of the air intake, wherein air heated by means of heat exchange downstream of the radiator is arranged to stream through the housing configuration.

According to an embodiment of the steering device air intake and radiator are arranged in connection to the first vehicle unit, which constitutes the front vehicle unit. Hereby efficient stream of air through the housing configuration during drive is obtained.

According to an embodiment of the steering device the housing configuration comprises several air outlets. Hereby efficient heating of the space is obtained in that the air is spread over the space in accordance with the placement of the air outlets.

According to an embodiment of the steering device said steering member comprises an essentially vertical link shaft about which said vehicle units are pivotable. Hereby easy and efficient pivoting of the vehicle units is facilitated.

According to an embodiment of the steering device said means for mutually pivoting said vehicle units comprises a first and second steering element. Hereby efficient steering of the vehicle is obtained in that the steering is facilitated by two steering elements. The steering elements are preferably constituted by steering cylinders which preferably are hydraulic.

According to an embodiment of the steering device said means comprises the bottom part of the housing configuration, which comprises two mutually movable protective elements arranged to, in a non-pivoting state of the vehicle, partly overlap each other, and, in a pivotable state of the vehicle, provide a drainage opening of the bottom part. Hereby removal of stuff such as rocks, gravel or the corresponding introduced from the surrounding is facilitated. Thereby is avoided that rocks, gravel or the corresponding in the housing configuration affects the steering and drive shaft through the steering device, wherein the reliability is thus improved.

According to an embodiment of the steering device said protective elements are mutually pivotable about said vertical link shaft. Hereby a simple overlapping sealing and drainage opening during pivot of said vehicle about the link shaft is facilitated.

According to an embodiment of the steering device said housing configuration constitutes a separate unit. Hereby easy upgrade of existing vehicles is facilitated in that the steering device is configured to be attached to the existing vehicle.

According to an embodiment of the steering device said housing configuration has a tunnel configuration. Hereby easy lead-through of supply means such as drive means, brake fluid, hydraulics, cardan shaft etc. is facilitated.

According to an embodiment of the steering device said housing configuration has ballistic protection properties. Hereby protection against effective fire is obtained.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION

With supply space is herein intended a space of the vehicle through which supply means such as cables for electric supply, hose for fuel supply, cardan shaft for drive supply of transmission to the second vehicle unit of the articulated vehicle, conduit for cold/hot water for air-conditioning device, and/or conduit for brake fluid for supply of brakes of the articulated vehicle may be transported.

Figure 1:
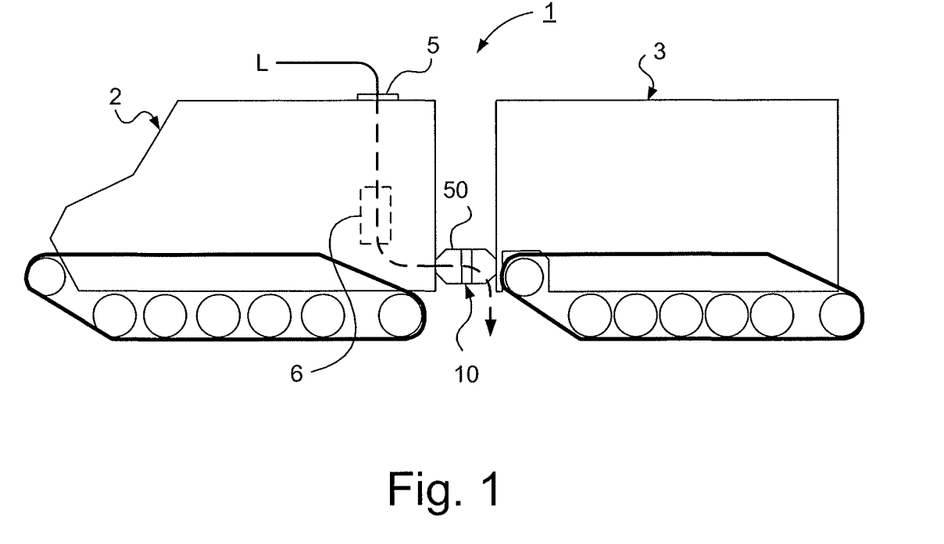
FIG. 1 schematically illustrates a side view of an articulated vehicle with a protection device according to an embodiment of the present invention.
Figure 2:
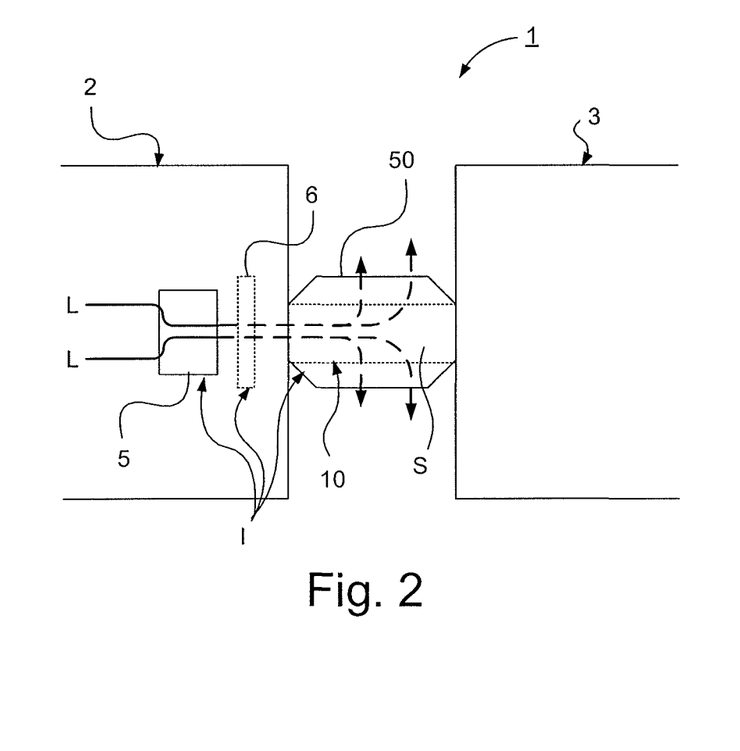
FIG. 2 schematically illustrates a plan view of a part of the articulated vehicle in FIG. 1.

FIGS. 1 and 2 schematically illustrates a side view and a plan view respectively of an articulated vehicle 1, here articulated tracked vehicle comprising a first front vehicle unit 2 and a second rear vehicle unit 3. The articulated vehicle 1 comprises a steering device I according to the present invention. The steering device I comprises a steering member 10 for mutually steering the first and second vehicle units 2, 3 of the articulated vehicle 1.

The first and second vehicle units 2, 3 of the articulated vehicle 1 are consequently steerably interconnected by means of the steering device I. the articulated vehicle 1 comprises an air intake 5 arranged to receive air L from the surrounding.

The vehicle further comprises a radiator 6 arranged downstream of the air intake for cooling components in the vehicle 1. The air L heated downstream of the radiator 6 is arranged to stream through a housing configuration 50 of the steering device I.

The housing configuration 50 is arranged to form a supply space S between said vehicle units 2, 3. The housing configuration 50 is arranged to form a protection about at least a part of the steering member 10. The housing configuration 50 consequently forms a protected space in which at least a part of the steering member 10 is arranged. The steering device I comprises means for removing stuff introduced from the surrounding, said stuff according to an embodiment comprising snow and/or ice. Said means for removing stuff within the housing configuration 50 comprises a heating device arranged to stream air from the radiator 6 of the vehicle 1 through the housing configuration for heating.

Said heating device comprises the air intake 5 arranged in the first vehicle unit 2 and the radiator 6 arranged in the vehicle downstream of the air intake 5 to cool components in the vehicle by means of said through the air intake 5 received air L, wherein air L heated through heat exchange downstream of the radiator 6 is arranged to be streamed through the housing configuration 50 such that it heats on and in connection to the steering member 10 in the housing configuration 50. The air L is according to a variant arranged to be let out through opening in the housing configuration.

FIG. 3-9 schematically illustrate different views and details of a protection device I for mutually steering a first vehicle unit 2 and a second vehicle unit 3 of an articulated vehicle 1, e.g. according to FIG. 1, according to an embodiment of the present invention. The steering device I comprises a steering member 10 for mutually steering the first vehicle unit 2 and the second vehicle unit 3, and a housing configuration 50 arranged to surroundingly protect the vehicle 10.

Figure 3:
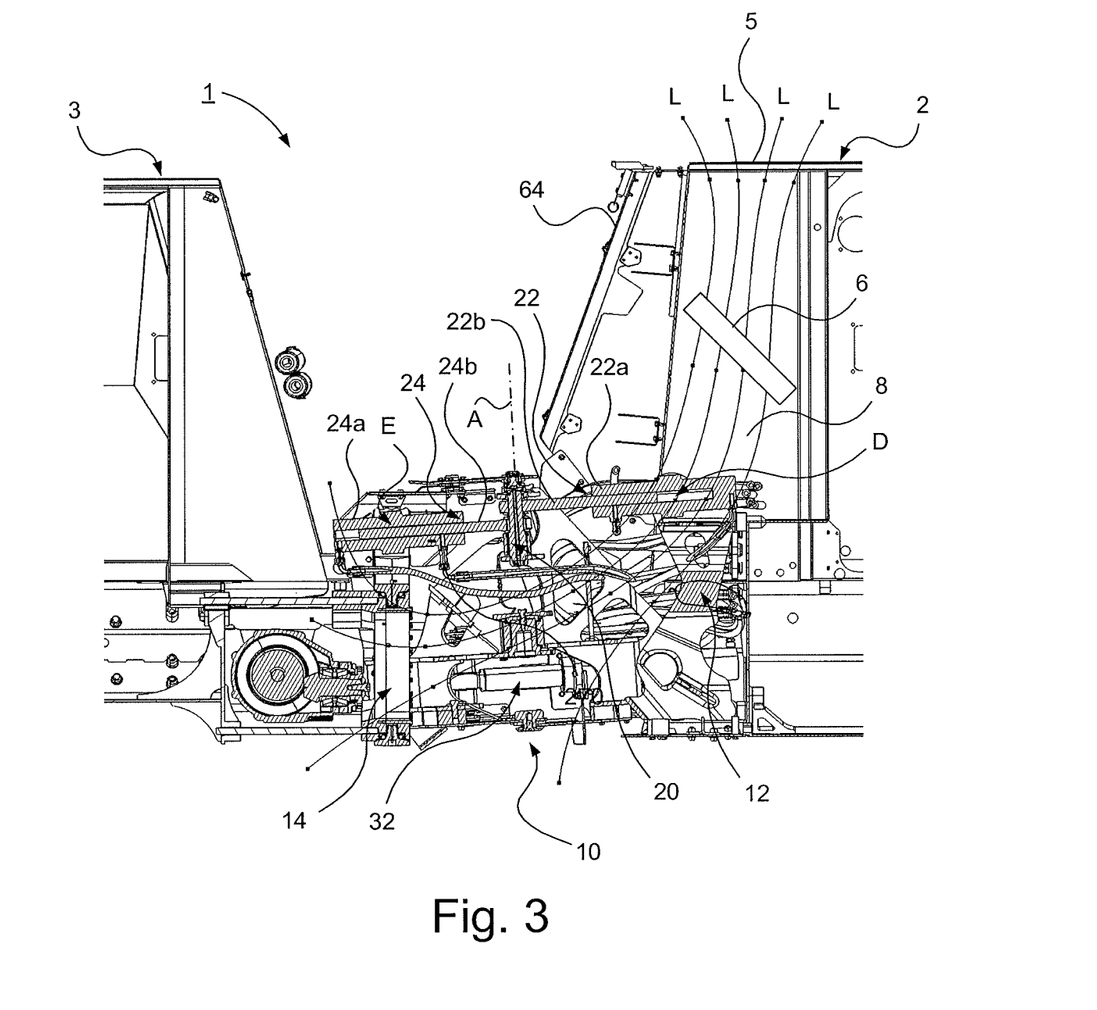
FIG. 3 schematically illustrates a cross sectional view from the side of a part of an articulated vehicle with a steering device according to an embodiment of the present invention.
Figure 4:
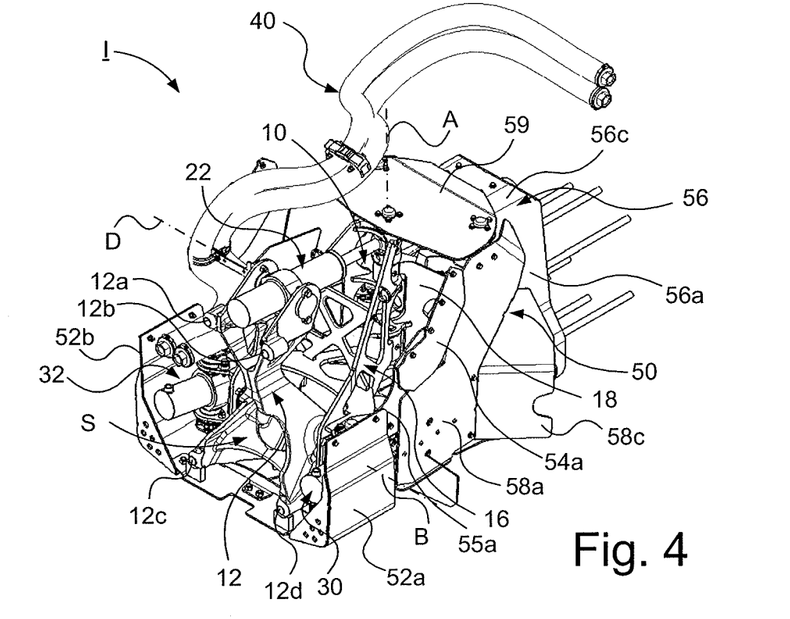
FIG. 4 schematically illustrates a perspective view obliquely from above of a protection device according to an embodiment of the present invention.
Figure 5:
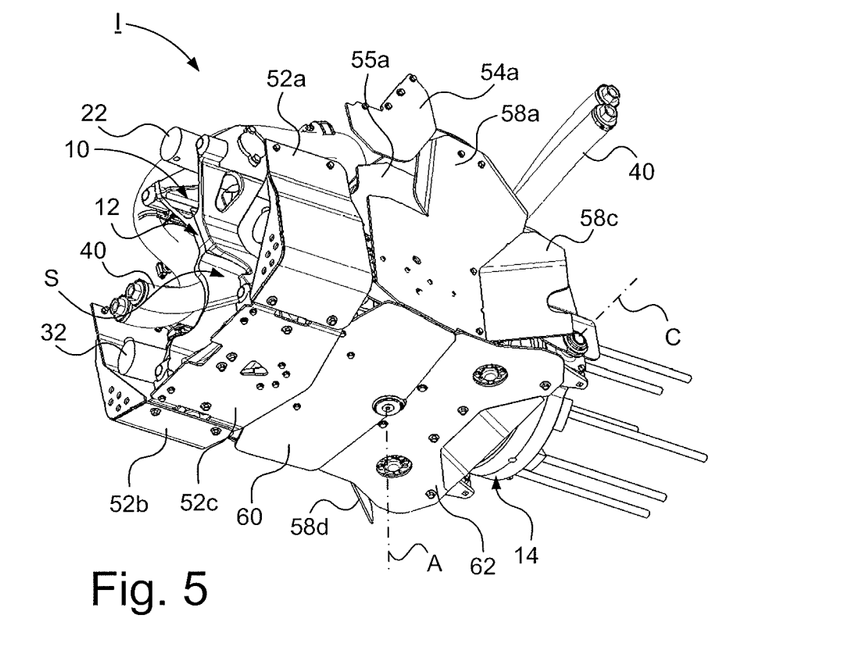
FIG. 5 schematically illustrates a perspective view obliquely from below of the protection device in FIG. 4.
Figure 6:
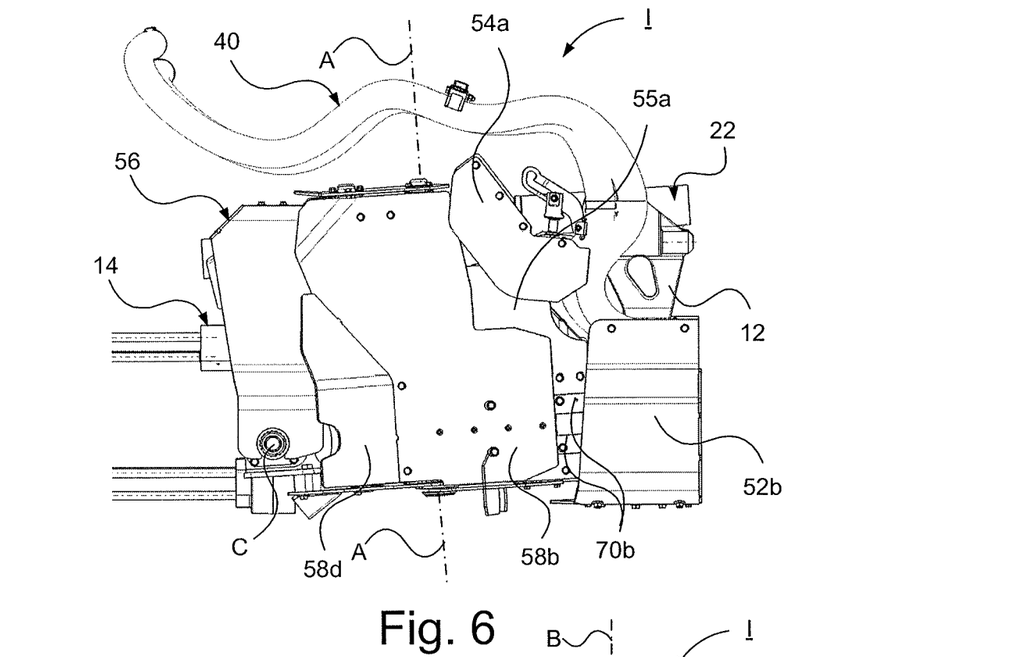
FIG. 6 schematically illustrates a side view of the protection device in FIG. 4.
Figure 7:
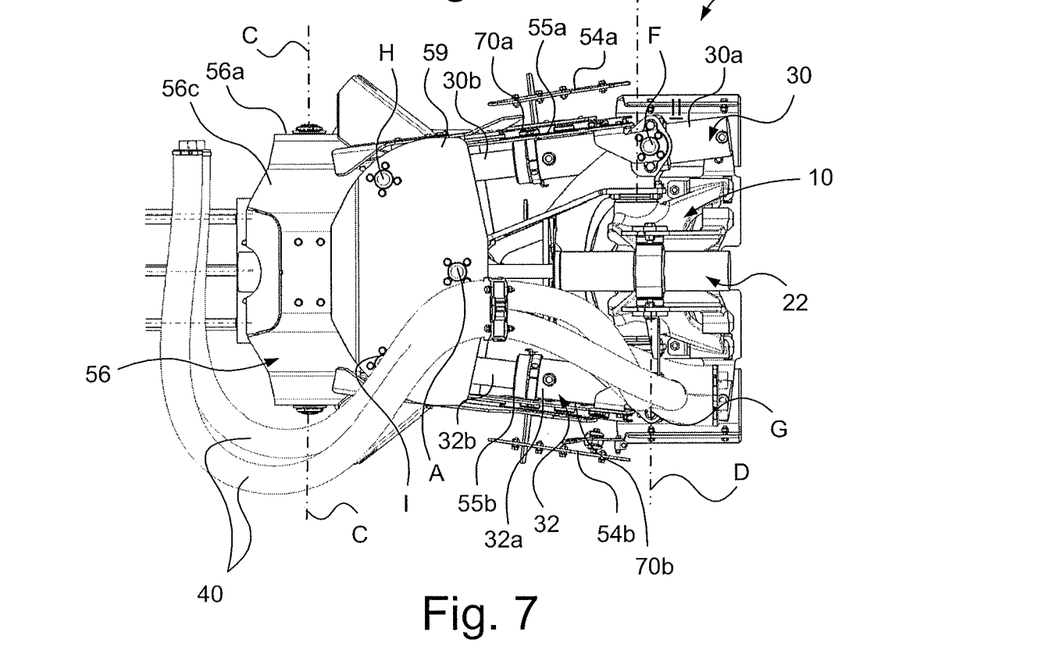
FIG. 7 schematically illustrates a plan view from above of the steering device in FIG. 4.

As is evident from FIG. 3 the articulated vehicle 1 comprises an air intake 5 arranged in the upper portion of the front vehicle unit 2, and a radiator 6 arranged in the front vehicle unit 2 downstream of the air intake 5 to cool in the vehicle by means of said through the air intake 5 received air L, wherein air L heated through heat exchange is arranged to be streamed through the housing configuration 50.

The air is arranged to stream in through the air intake 5 and further via the radiator 6 in an air stream path 8, wherein the heated air L is arranged to stream into the housing configuration 50 and out through openings of the housing configuration 50 constituting air outlets. The air intake 5 and the radiator 6 constitute a heating device.

Hereby is facilitated to remove snow and/or ice introduced from the surrounding by heating it by means of the heated air L being arranged to stream through the housing configuration 50. Further, building of ice is prevented in that the space is kept warm by means of the air streaming through the housing configuration 50. Hereby the risk of snow and/or ice in the housing configuration 50 affecting the steering is avoided/reduced, wherein the reliability thus is improved.

The steering member 10 of the steering device I comprises a front fastening member 12 arranged to be assembled at the first vehicle unit 2. According to this embodiment the first vehicle unit 2 constitutes the front vehicle unit 2, wherein the front fastening member 12 is intended to be arranged on the rear end of the first front vehicle unit 2.

The steering member 10 further comprises a rear fastening member 14 arranged to be assembled at the second vehicle unit 3, which consequently here constitutes the rear vehicle unit 3 such that the rear fastening member 12 is intended to be arranged at the front end of the rear vehicle unit 3.

The steering member 10 comprises an essentially vertical link shaft A about which said vehicle units 2, 3 are pivotable.

The front fastening member 12 is intended for fixed non-rotational assembling at the rear end of the front vehicle unit 2. The fastening member comprises a number of fasteners 12a, 12b, 12c, 12d. The front fastening member 12 has an essentially X-shaped configuration wherein openings are formed for said supply means.

The steering member 10 further comprises a front steering link 16 which is pivotably connected to said front fastening member 12 about a first transversal horizontal shaft B.

The rear fastening member 14 is intended for assembling at the front end of the rear vehicle unit 3. The rear fastening member 14 is arranged to allow rotation relative to the rear vehicle unit 3.

The steering device 10 further comprises a rear steering link 18 which is rotatably connected to said rear fastening member 14 about a longitudinal shaft, i.e. rotatably journalled in bearings for allowing by means of the steering member 10 different side inclination positions of the front and rear vehicle units 2, 3.

The rear steering link 18 is pivotably connected to said rear fastening member 14 about a second transversal horizontal shaft C.

The front and rear steering link 16, 18 are articulately connected to each other over a steering link with the vertical link shaft A, the front and rear steering link 16, 18 forming a steering link unit 20.

The steering member 10 further comprises a front tilt cylinder unit 22 and a rear tilt cylinder unit 24 as is evident from FIG. 3. The respective tilt cylinder unit 22, 24 comprises a cylinder part 22a, 24a and a piston rod part 22b, 24b. The respective tilt cylinder unit 22, 24 is according to an embodiment a hydraulic tilt cylinder unit 22, 24.

The front fastening member 12 is articulately connected to the upper portion with an end area of said tilt cylinder unit 22 about a third transversal horizontal shaft D wherein an opposite end area of the front tilt cylinder unit 22 is articulately connected in the upper portion of the steering link unit 20.

The rear fastening member 14 is articulately connected in the upper portion to an end area of said rear tilt cylinder unit 24 about a fourth transversal horizontal shaft E parallel to the third shaft D wherein an opposite end area of the rear tilt cylinder unit 24 is articulately connected in the upper portion of the steering link unit 20.

The steering member 10 further comprises first and second steering elements in the shape of a first and second steering cylinder unit 30, 32 arranged to mutually swing said first and second vehicle unit 2, 3 about the link shaft A. The respective steering cylinder unit 30, 32 is in its one end area connected to the front steering link 12 at the respective vertical link shafts F, G. The respective steering cylinder unit is in its other end area connected to the rear steering link at the respective vertical link shaft H, I.

The respective steering cylinder unit 30, 32 comprises a cylinder part 30a, 32a and a piston rod part 30b, 32b arranged to move in the cylinder part 30a, 32a. The steering cylinder units 30, 32 are arranged to co-operate in such a way that when one of the piston rod parts 30b, 32b is retracted in its cylinder part 30a, 32a, the other piston rod part 32b, 30b is projected out of its cylinder part 32a, 30a. Hereby the allied vehicle units 2, 3 are brought to be steered either to the left or to the right about the vertical link shaft A. According to this embodiment said steering cylinder units 30, 32 are hydraulic.

The four parallel transversal horizontal shafts B, C, D, E of the steering device I facilitates for the steering device I and thereby the allied vehicle units 2, 3 to perform vertical pivotal and link movements, wherein the horizontal shafts B, C, D, E may constitute link shafts in a parallelogram, such that the steering links 12, 14 and thereby the vehicle units 2, 3, also may perform mutual movements in the vertical direction.

The steering device I further comprises said housing configuration 50 arranged to form a supply space S between the first and second vehicle units 2, 3. The housing configuration 50 is arranged in such a way that the steering cylinder units 30, 32 and also the tilt cylinder units 22, 24 essentially are surrounded such that they are protected from outer damage such as effective fire.

The housing configuration 50 has ballistic protection properties.

The steering device further comprises hoses 40 from the front vehicle unit 2 to the rear vehicle unit 3 for supply of the heating system in the rear vehicle unit 3.

The housing configuration 50 comprises a front protection element arranged in connection to the front fastening member 12. The front protection element comprises a first protection element part 52a arranged to run along one side around to the underside and covering a part of the front side. The front protection element further comprises a second protection element part 52b opposite to the first protection element part 52a arranged to run along the other side around to the underside and covering a part of the front side. The front protection element comprises an intermediate protection element part 52c arranged on the underside between the first and second protection element part of the front protection element.

The housing configuration 50 further comprises front side protection elements 54a, 54b, 55a, 55b arranged on each side in connection to the front steering link. Said front side protection elements comprise respective outer protection element parts 54a, 54b and inner protection element parts 55a, 55b at least partly overlapping each other.

The inner protection part 55a is fixedly connected to the steering cylinder unit 30 and will consequently pivot with the steering cylinder unit 30. The inner protection element part 55b is connected to the steering cylinder unit 32 and will consequently pivot with the steering cylinder unit 32.

The space between the outer and inner protection element parts forms opening for air outlet of the air streaming through the air intake via the radiator.

The housing configuration 50 further comprises a rear protection element 56 arranged in connection to the rear fastening member 14. The rear protection element comprises a first protection element portion 56a arranged to run along one side and a second protection element portion 56b arranged to run along the opposite side, and an intermediate upper protection element portion 56c between the first and second protection element portions, said protection element portions 56a, 56b, 56c being constituted by one piece.

The housing configuration 50 further comprises first and second rear side protection elements 58a, 58b arranged on each side in connection to the rear steering link. The rear side protection element 58a is pivotably journalled at the shaft H and the rear side protection element 58b is pivotably journalled at the shaft I.

The steering device comprises guide members 70a, 70b arranged in connection to the respective inner protection element part 55a, 55b and rear side protection element 58a 58b. The respective rear side protection element 58a, 58b is connected to the respective guide member, wherein the respective guide member is arranged to retain the respective rear side protection element 58a, 58b along the side by preventing them from swivelling out, and wherein the respective guide member 70a, 70 allows the respective rear protection element to move relative to the respective inner protection element part in the longitudinal direction of the steering member.

The housing configuration further comprises a rear upper protection element 59 arranged on the upper side intermediate to the rear side protection elements 58*a*, 58*b* to protectively cover the rear steering link 18 and the rear tilt cylinder unit 24.

The housing configuration further comprises third and fourth rear side protection elements 58*c*, 58*d* partly projecting from the side.

The housing configuration 50 further comprises a front under protection element 60 arranged on the underside of the steering member pivotable about the vertical link shaft A in connection to the front steering link 16.

The housing configuration 50 further comprises a rear under protection element 62 arranged on the underside of the steering member pivotable about the vertical link shaft A in connection to the rear steering link 18.

The front under protection element 60 and the rear under protection element 62 are consequently pivotably arranged about the vertical link shaft A. the front and rear under protection element 60, 62 are consequently mutually movable relative to each other.

Figure 8:
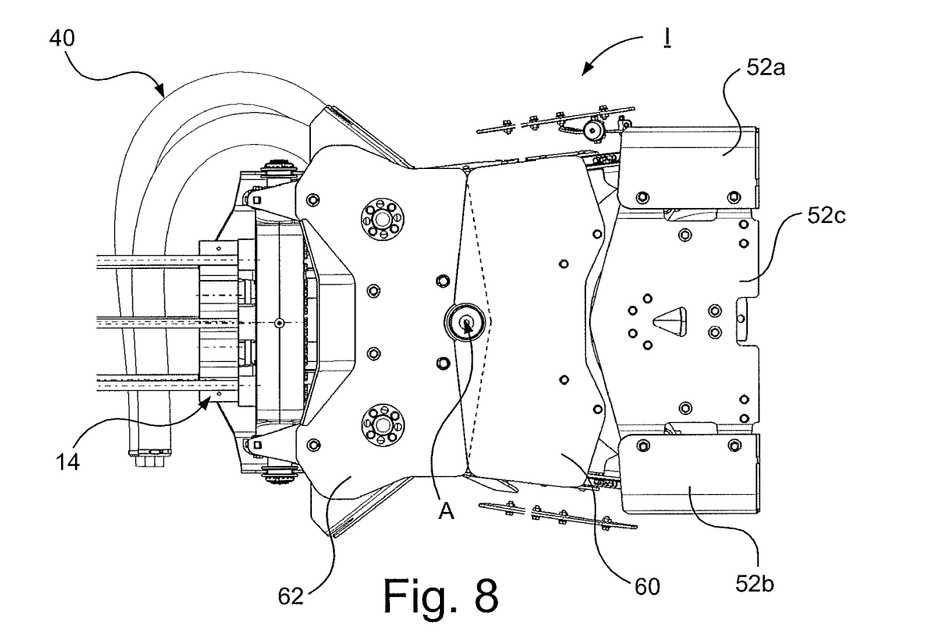
FIG. 8 schematically illustrates a plan view from below of the steering device in FIG. 4.
Figure 9:
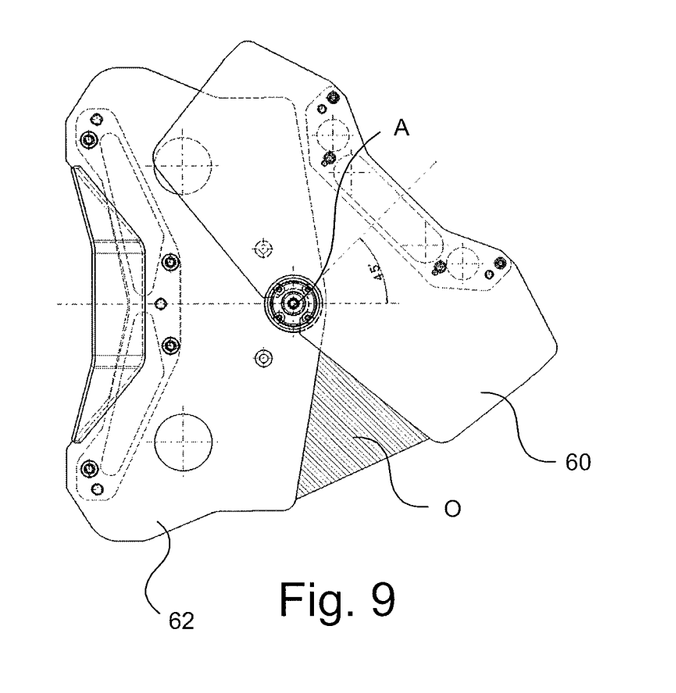
FIG. 9 schematically illustrates a plan view from below of a part of a housing configuration of the steering device in FIG. 4.

The front and rear under protection element 60, 62 are arranged to, in a non-pivoting state of the vehicle partly sealingly overlap each other, and in a pivotable state of the vehicle providing a drainage opening O of the bottom part. FIG. 8 shows the front and rear under protection elements 60, 62 in a non-pivoting state and FIG. 9 shows the front and rear under protection elements 60, 62 in a pivoting state. Hereby is facilitated to, in the pivoting state, drainage the vehicle of incoming stuff such as gravel and rocks in that the stuff is allowed to fall out through the drainage opening O provided between the front and rear under protection element 60, 62.

As is evident from FIG. 3 the front vehicle unit has in the rear portion a hood like casing 64 which is arranged to protectively cover the front fastening member 12, the front steering link 16 and the front tilt cylinder unit 22.

The housing configuration 50 has a telescopic function in that the housing configuration 50 comprises protection elements/protection element parts 55*a*, 55*b*, 58*a*, 58*b* arranged on each side thereof partly on each other and slidably relative to each other. Hereby said protection elements/protection element parts are arranged slidably relative to each other are arranged such that when the vehicle units pivots relative to each other about the link shaft A the protection elements on one side slides together such that they cover more of each other and the protection elements on the opposite side slides apart such that they cover less of each other. Hereby a more fully covering protection even by pivoting of the vehicle units relative to each other is obtained.

The housing configuration comprises a number of air outlets formed through openings between the above mentioned protection element and protection element parts for air outlet of the air L streaming through the air intake via the radiator such that the streaming air among others is let out through the side and downward.

The steering member of the steering device I above comprises first and second steering elements arranged to mutually pivot said vehicle units, said steering elements being constituted by steering cylinder units with cylinder and piston, which steering cylinder units are hydraulic.

Any suitable steering element could alternatively be used. According to an embodiment the steering elements of the steering member described above are constituted by gear rack elements. According to an embodiment the steering elements of the steering member described above are constituted by a linear motor, which according to a variant is built up with a ball screw and a ball nut which is arranged to run along the ball screw, wherein the nut is arranged to be moved by rotating the ball screw by means of an electric motor or hydraulic motor or the corresponding.

The steering cylinder units of the steering vehicle described above are arranged such that they are protected by the housing configuration 50. According to an alternative embodiment of the steering device I said steering elements are arranged such that they are protected by one of the vehicle units, according to a variant internally to one of the vehicle units, according to another variant under one of the vehicle units.

The steering member describe above comprises tilt elements, said tilt elements being constituted by tilt cylinder units with cylinder and piston rod, which tilt cylinder units are hydraulic.

Any suitable tilt elements could alternatively be used. According to an embodiment the tilt elements of the steering member described above are constituted by gear rack elements. According to an embodiment the tilt elements of the steering member described above of are constituted by a linear motor, which according to a variant is built up with a ball screw and a ball nut which is arranged to run along the ball screw, wherein the nut is arranged to be moved by rotating the ball screw by means of an electric motor or hydraulic motor or the corresponding.

Above a steering device with a steering member for mutually steering a first vehicle unit and a second vehicle unit of an articulated vehicle, the steering member comprising an essentially vertical link shaft about which said vehicle units are pivotable, first and second steering elements in the shape of hydraulic steering cylinders arranged to mutually pivot said vehicle units, wherein the steering device comprises a housing configuration arranged to form a supply space between said vehicle units. Any suitable steering member with a housing configuration arranged to form a supply space between said vehicle units, comprising means arranged for removal of stuff introduced in the supply space from the surrounding, said means comprising a heating device arranged to heat air intended to stream through the housing configuration such that snow/ice introduced into the housing configuration may be reduced/eliminated by means of the hot streaming air.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A steering device comprising:
    a steering member for mutually steering a first vehicle unit and a second vehicle unit of an articulated vehicle, which comprises a link mechanism for mutually pivoting said vehicle units
    a housing configuration arranged to form a supply space between said vehicle units; and
    a removal mechanism arranged in the supply space,
    wherein the removal mechanism comprises a bottom part of the housing configuration, which comprises two mutually movable protective elements arranged to, in a non-pivoting state of the vehicle, partly overlap each other, and, in a pivoting state of the vehicle, provide a drainage opening of the bottom part.

2. A steering device according to claim 1, wherein said protective elements are mutually pivotable about a vertical link shaft.

3. A steering device according to claim 1, wherein said housing configuration constitutes a separate unit.

4. A steering device according to claim 1, wherein said housing configuration has a tunnel configuration.

5. A steering device according to claim 1, wherein said housing configuration has ballistic protection properties.

6. Articulated vehicle comprising a steering device according to claim 1.

7. Articulated vehicle according to claim 6, wherein said articulated vehicle is a tracked vehicle.

* * * * *